UNITED STATES PATENT OFFICE.

ANTON P. JAEGER, OF BROOKLYN, NEW YORK, ASSIGNOR, BY MESNE ASSIGNMENTS, TO TITAN CO. A/S., OF CHRISTIANIA, NORWAY.

TITANIUM PIGMENT AND PROCESS OF MAKING SAME.

1,317,165.   Specification of Letters Patent.   Patented Sept. 30, 1919.

No Drawing.   Application filed May 13, 1918. Serial No. 234,324.

*To all whom it may concern:*

Be it known that I, ANTON P. JAEGER, a subject of the King of Norway, and a resident of the city of New York, borough of Brooklyn, have invented certain new and useful Improvements in Titanium Pigments and Processes of Making Same, of which the following is a specification.

This invention relates to white pigments the essential component of which is a titanium oxygen compound. The object of the invention is the production of an improved pigment of this class.

In my application Serial No. 135,148 filed December 5, 1916, I have set forth a process whereby pigments of the said class are rendered stable against the disintegrating action of the elements by the presence of a white and relatively insoluble compound of a metal. That process is characterized by mixing the said compound with a titanium compound and, if desired or necessary, reducing the mixture to a suitable form for incorporation with a vehicle. In the present process on the other hand, the white and relatively insoluble compound of the metal is not added to the titanium oxygen compound as such, but is produced in the process itself. The purpose of this invention is to produce by a single process a white pigment which combines hiding power, color stability against the action of light, and resistance to the disintegrating action of the elements.

The material employed in this invention for effecting the desired result is the salt of a metal which is soluble but the hydroxid of which is white and relatively insoluble. This salt is commonly employed in connection with a decomposition agent which converts the titanium compound to a salt thereof. After decomposition, the mass is subjected to at least a sufficient degree of heat, in the presence of a halogen compound if desired, to cause decomposition of the metal salt added or formed on the first reaction; and the sintered or smelted product is then, if necessary, reduced to the desired form for incorporation in a vehicle. If a halogen compound has been employed and a soluble salt formed, it is desirable to subject the product to lixiviation to remove the said soluble salt. The residue is then dried and calcined if desired, and subsequently reduced to convenient form for incorporation in the vehicle. Examples of suitable salts for employment herein are the sulfates of zinc, aluminium, magnesium, etc. If the metal salt is one which would release a volatile acid when subjected to the action of the decomposition agent, it is preferable to make the addition after the initial decomposition has taken place. Examples of suitable salts of this character are chlorids of the above mentioned metals.

The material to be added in accordance herewith need not be a single salt but may be a mixture of two or more of the salts above defined; and the quantity to be added will depend upon the desirability of the product possessing qualities characteristic of the resultant metal compound. The presence of five per cent. by weight of the resultant metal compound in the product has been found to produce a marked improvement in regard to color and resistance to disintegration.

In the following example of the invention I employ a halogen compound, and have selected as the material to be treated a titanium oxygen compound having present a small percentage of iron and sulfuric anhydrid, sulfuric acid as the decomposition agent, zinc sulfate as the salt, and sodium chlorid as the halogen compound; but it is to be understood that the invention is not intended to be limited thereby nor to the specific substance chosen for illustrative purposes.

The titanium oxygen compound if necessary having first been reduced to convenient form for treatment, as by crushing or grinding, is introduced into a suitable container, and sulfuric acid and the desired quantity of zinc sulfate added.

The contents of the container are thoroughly stirred and heated until reaction has taken place and a comparatively solid mass is formed. This mass is then ground with the desired quantity of sodium chlorid, preferably, though not necessarily, in the proportion of one part by weight of the mass to 1.4 parts of sodium chlorid. The resultant mixture is heated to temperatures ranging substantially from 300° to 700° C. whereby a sintering or smelting is effected. This results in the formation of the oxids of titanium and zinc, and in the conversion in whole or in part of the sodium chlorid to sodium sulfate. The sintered or smelted mass is then lixiviated to remove the soluble salts, and the residue dried and calcined if desired and subsequently reduced if necessary to a convenient form for incorporation in a vehicle.

The pigment formed in accordance with this invention is characterized by satisfactory hiding power and color, and by the readiness with which it mixes with a vehicle. A paint formed therefrom is durable against the disintegrating action of the elements. The composition of the product of course depends upon the materials employed in obtaining it. The product formed in the example given comprises essentially titanium oxid and zinc oxid with small percentages of iron, sulfuric anhydrid and water of hydration, the latter depending upon the temperatures employed.

The foregoing detailed depscription has been given for clearness of undertsanding and no undue limitation should be deduced therefrom, but the appended claims should be construed as broadly as permissible in view of the prior art.

What I claim is new and desire to secure by Letters Patent is:

1. The process of producing a material suitable for use as or in the manufacture of a pigment comprising a substance containing combined titanium and a compound of a metal the hydroxid of which is white and relatively insoluble, which comprises heating a titanium salt and a soluble salt of the said metal to temperatures sufficient to decompose the said salts.

2. The process of producing a material suitable for use as or in the manufacture of a pigment comprising a substance containing combined titanium and combined zinc, which comprises heating a titanium salt with a zinc salt to temperatures sufficient to decompose the said salts.

3. The process of producing a material suitable for use as or in the manufacture of a pigment comprising a substance containing combined titanium and combined zinc, which comprises heating titanium sulfate and zinc sulfate to temperatures sufficient to decompose the said salts.

4. The process of producing a material suitable for use as or in the manufacture of a pigment comprising a substance containing combined titanium and a compound of a metal the hydroxid of which is white and relatively insoluble, which comprises subjecting a titanium oxygen compound to the action of a decomposition agent to form a salt and heating the resultant product together with a soluble salt of the aforesaid metal to temperatures sufficient to decompose the said salts.

5. The process of producing a material suitable for use as or in the manufacture of a pigment which comprises a substance containing combined titanium and combined zinc, which comprises subjecting a titanium oxygen compound to the action of a decomposition agent to form a salt and heating the resultant product together with a zinc salt to temperatures sufficient to decompose the said salts.

6. The process of producing a material suitable for use as or in the manufacture of a pigment which comprises a substance containing combined titanium and combined zinc, which comprises subjecting a titanium oxygen compound to the action of sulfuric acid to form a salt and heating the resultant product together with a zinc sulfate to temperatures sufficient to decompose the said salts.

7. The process of producing a material suitable for use as or in the manufacture of a pigment comprising a substance containing combined titanium and a compound of a metal the hydroxid of which is white and relatively insoluble, which comprises subjecting a titanium oxygen compound to the action of a decomposition agent to form a salt and heating the resultant product together with a soluble salt of the aforesaid metal in the presence of a halogen compound to temperatures sufficient to decompose the said salts.

8. The process of producing a material suitable for use as or in the manufacture of a pigment comprising a substance containing combined titanium and combined zinc, which comprises subjecting a titanium oxygen compound to the action of sulfuric acid in the presence of zinc sulfate and heating the decomposition product in the presence of a halogen compound to temperatures sufficient to decompose the decomposition product and the zinc sulfate.

9. The process of producing a material suitable for use as or in the manufacture of a pigment comprising a substance containing combined titanium and combined zinc, which comprises subjecting a titanium oxygen compound to the action of sulfuric acid in the presence of zinc sulfate and heating the decomposition product and zinc sulfate in the presence of sodium chlorid to temperatures sufficient to decompose the decomposition product and the zinc sulfate.

10. The process of producing a material suitable for use as or in the manufacture of a pigment comprising a substance containing combined titanium, iron, combined zinc, sulfuric anhydrid and water of hydration, which comprises subjecting a titanium oxygen compound containing iron and sulfuric anhydrid to the action of sulfuric acid in the presence of zinc sulfate, heating the decomposition product and the zinc sulfate in the presence of sodium chlorid to temperatures sufficient to decompose the decomposition product and the zinc sulfate and form titanium dioxid, and zinc oxid, and removing the soluble salts by washing.

11. As a new and useful article of manufacture, a material suitable for use as or in the manufacture of a pigment, comprising a substance containing combined titanium and the compound of a metal the salt of which is soluble and the hydroxid of which is white and relatively insoluble, formed by heating a titanium salt and a soluble salt of the said metal to temperatures sufficient to decompose the said salts.

12. As a new and useful article of manufacture, a material suitable for use as or in the manufacture of a pigment, comprising a substance containing combined titanium and combined zinc, formed by heating a titanium salt and a zinc salt to temperatures sufficient to decompose the said salts.

13. As a new and useful article of manufacture, a material suitable for use as or in the manufacture of a pigment, comprising a substance containing combined titanium and combined zinc, formed by subjecting a titanium oxygen compound to the action of sulfuric acid to form a salt and heating the salt thus formed together with zinc sulfate to temperatures sufficient to decompose the said salts.

14. As a new and useful article of manufacture, a material suitable for use as or in the manufacture of a pigment, comprising a substance containing combined titanium and combined zinc, formed by subjecting a titanium oxygen compound to the action of sulfuric acid to form a salt and heating the salt thus formed together with zinc sulfate in the presence of sodium chlorid to temperatures sufficient to decompose the said salts.

15. As a new and useful article of manufacture, a material suitable for use as or in the manufacture of a pigment, comprising a substance containing combined titanium and combined zinc, together with smaller percentages of combined iron, sulfuric anhydrid and water of hydration.

16. As a new and useful article of manufacture, a material suitable for use as or in the manufacture of a pigment, comprising a substance containing combined titanium and combined zinc, together with smaller percentages of combined iron, sulfuric anhydrid and water of hydration, formed by subjecting a titanium oxygen compound to the action of sulfuric acid to form a salt, heating said salt together with zinc sulfate and sodium chlorid to temperatures sufficient to decompose the said salts and removing the soluble salts by washing.

Signed at New York, N. Y., this 9th day of May, 1918.

ANTON P. JAEGER.